United States Patent [19]  [11] 3,974,238
Schweiker et al.  [45] *Aug. 10, 1976

[54] SOLID RUBBER GOLF BALL

[75] Inventors: George C. Schweiker, Ardmore, Pa.; John W. Jepson, Marion, Mass.

[73] Assignee: Acushnet Company, New Bedford, Mass.

[ * ] Notice: The portion of the term of this patent subsequent to Feb. 12, 1991, has been disclaimed.

[22] Filed: Oct. 11, 1974

[21] Appl. No.: 514,274

Related U.S. Application Data

[60] Continuation-in-part of Ser. No. 406,335, Oct. 15, 1973, abandoned, which is a division of Ser. No. 203,856, Dec. 1, 1971, Pat. No. 3,791,655.

[52] U.S. Cl. ................ 260/879; 260/998.14; 273/218
[51] Int. Cl.² ............................................ C08L 9/00
[58] Field of Search .................... 260/879, 880 R

[56] References Cited

UNITED STATES PATENTS

| 3,313,545 | 4/1967 | Bartsch | 273/218 |
| 3,438,933 | 4/1969 | Bartsch | 260/879 |
| 3,502,338 | 3/1970 | Cox | 273/218 |
| 3,791,655 | 2/1974 | Schweiker | 260/879 |
| 3,796,773 | 3/1974 | Coleman | 260/879 |

Primary Examiner—Paul R. Michl
Attorney, Agent, or Firm—Eyre, Mann, Lucas & Just

[57] ABSTRACT

A solid rubber golf ball is disclosed. The golf ball is made from a composition comprising polybutadiene and an unsaturated carboxamide cross-linking said polybutadiene.

11 Claims, No Drawings

SOLID RUBBER GOLF BALL

This application is a continuation-in-part of co-pending application Ser. No. 406,335 filed Oct. 15, 1973 now abandoned which in turn was a divisional application of Ser. No. 203,856 filed Dec. 1, 1971 and issued on Feb. 12, 1974 as U.S. Pat. No. 3,791,655.

The present invention relates to a new and useful solid rubber golf ball. The solid rubber golf ball is made from a polybutadiene and an $\alpha, \beta$ ethylenically unsaturated carboxamide graft polymerized thereto, said polybutadiene being cross-linked by hydrogen bonding of said carboxamides.

Until recently, virtually all golf balls were made by winding a thin elastic band around a central core and covering the core so formed with a rubber composition such as balata. These golf balls are characterized by good flight characteristics, good "click" and "feel" and good distance in flight. More recently, so called solid rubber golf balls have been developed which are homogeneous golf balls of one composition or are two part golf balls with a solid core and a standard rubber cover. While these solid rubber golf balls in many ways imitate the wound golf balls, they are frequently lacking in qualities such as good "click" and "feel" and many of these golf balls will split after being struck a number of times. The applicants have discovered that a solid rubber golf ball made from polybutadiene and an unsaturated carboxamide graft polymerized thereto yields a highly desirable golf ball having good "click" and "feel", excellent durability, and good cohesive strength.

A golf ball according to the present invention is formed from polybutadiene and an unsaturated carboxamide graft polymerized thereto. The polybutadiene of the present invention preferably has a cis 1,4 content above about 40% and best results are achieved when the cis 1,4 content of the polybutadiene is above about 90%. These polybutadienes are commercially available under trade names such as Budene from Goodyear, Ameripol CB-220 from Goodrich, Taktene from Polysar, and Cis-4 from Phillips Petroleum. If desired, the polybutadiene backbone can be polymerized from monomeric butadiene.

An unsaturated carboxamide is grafted onto the polybutadiene backbone. The unsaturated carboxamide is an $\alpha, \beta$ ethylenically unsaturated carboxamide which may be represented by the following structural formula:

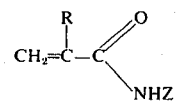

wherein R is hydrogen, or a methyl, ethyl, fluoro, chloro, or bromo group; and Z is hydrogen, or an alkyl, aryl, or heteroatom substituted alkyl or aryl group.

Suitable materials include the following carboxamides: acrylamide, methacrylamide, diacetone acrylamide, ethacrylamide, $\alpha$-fluoroacrylamide, N-phenylacrylamide, N-fluorophenylacrylamide, -chloroacrylamide, N-phenylmethacrylamide, N-chlorophenylacrylamide, $\alpha$-bromoacrylamide, N-bromophenylacrylamide, and N-methoxyphenylacrylamide.

The unsaturated carboxamide is preferably grafted onto the polybutadiene backbone with a free radical initiator such as dicumyl peroxide or other known free radical initiators although other suitable techniques of grafting may be employed such as heat, radioactivity, etc. The following illustrates grafting with a free radical initiator. The polybutadiene and the unsaturated carboxamide are admixed at a temperature between the glass transition temperature or melting point of the polymer and the boiling point of the unsaturated carboxamide and suitably about 200°–350°F. The mixing is continued until a cohesive mass is formed which is suitably from about 3 to 30 minutes. The temperature of the mix is then reduced to below the decomposition temperature of the free radical initiator to be employed. The free radical initiator is added and admixed at the reduced temperature, suitably for about 3–15 minutes. In the case of dicumyl peroxide, a temperature of about 150°F. is suitable. The mass is then suitably milled or cast into a slab from which pieces are cut slightly larger and heavier than the golf ball desired and placed in a standard ball cup mold. The composition in the mold is held under heat and pressure until the composition becomes hard. This will normally take between about 20 and 30 minutes at a temperature from about 280° to 320°F. Thereafter, the ball is removed from the mold and any "flash" formed is removed.

It is believed that the golf ball is held together as a cohesive mass by cross-linking of the hydrogen atoms of the amide group with double bonded oxygens of the carboxamide radical. The type of linking which is believed to take place may be schematically illustrated in the following manner:

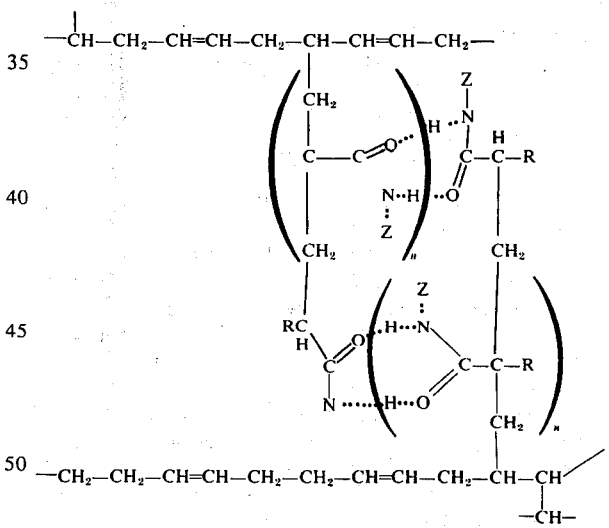

Wherein:
R is H, CH$_3$, C$_2$H$_5$, F, Cl, or Br;
Z is H, alkyl, aryl, or a heteroatom substituted alkyl or aryl group; and
n is a positive integer It is believed that it is this cross-linking which gives the ball not only good "click" but also good "feel." This type of cross-linking appears to have distinct advantage in golf balls over the simple cross-linking of a polymer with a monomer as is disclosed, for example, in Bartsch U.S. Pat. No. 3,313,545.

A golf ball according to the present invention preferably comprises per 100 parts of the polybutadiene, from about 1 to about 40 parts of the unsaturated carboxamide graft polymerized thereto. Excellent results have been obtained with compositions comprising per 100 parts of polybutadiene, from about 10 to about 25 parts of acrylamide or methacrylamide. This composition may also further include per 100 parts of polybutadiene, from about 25 to about 35 parts silica as a filler and from about 1 to about 5 parts titanium dioxide as a whitening agent. In forming this composition, about 1 part antioxidant and from about 4 to about 10 parts dicumyl peroxide have been found to give excellent results.

The golf ball composition of the present invention may also be used in a two or more part golf ball if desired. A two part golf ball is normally formed by making a core which is approximately the same size as the core of a wound golf ball and then adding a shell cover of approximately the size used for a wound golf ball. The composition of the present invention may be used for either the core or the shell cover but best results are obtained when the composition of the present invention is used as the core.

These and other aspects of the present invention may be more fully understood with reference to the following examples:

EXAMPLE 1

The following ingredients are used:

| Budene 501 | 100 parts |
| Acrylamide | 10 parts |
| Antioxidant | 1 part |
| Titanox A-MO | 2 parts |
| HiSil 215 | 33 parts |
| DiCup R | 5 parts |

Budene 501 is available from Goodyear and is a polybutadiene of about 92% cis 1,4 configuration, Titanox A-MO is titanium dioxide available from National Lead Co., HiSil is a silica available from PPG Industries, Inc. and DiCup is a dicumyl peroxide available from Hercules, Inc. The Antioxidant used is American Cyanamid 2246, a 2,2'-methylene bis (4-methyl-6-tertiary butyl phenol).

The ingredients without the DiCup R are mixed on a standard two roll mixer for 10 minutes at 225°F. The mixture is cooled to 150°F., the DiCup R is added and the mixture is mixed for an additional 5 minutes. Thereafter, the composition is cast as a slab approximately one-eighth of an inch thick. A two inch by one and one-half inch piece of the slab, weighing about 55 grams, is cut from the slab, rolled upon itself, and placed in a standard golf ball mold. The mold is closed under pressure at a temperature of about 300°F. and the composition is held under this temperature and pressure for about 30 minutes. Thereafter, the ball is removed from the mold and is allowed to secondarily cure for 24 hours at room temperature. After the secondary cure, the ball is found to have the following physical properties:

| PGA Compression | 38 |
| Hardness, Shore C | 71 |
| Rebound | 60 |

The ball withstands guillotine tests of both eight and ten pounds. When driven on a golf ball driving machine, the ball has an initial velocity of about 221 feet per second which corresponds to approximately 248 feet per second on the standard USGA testing equipment. The maximum allowable initial velocity on the USGA equipment is 250 feet per second (2% tolerance). The ball is tested as a golf ball and is found to have excellent "click" and "feel" and maintains its structural integrity despite many hits with a golf club.

EXAMPLE 2

Example 1 is repeated except that Ameripol CB-220 is substituted for the polybutadiene and the parts by weight of acrylamide is 15 parts. Ameripol CB-220 is a polybutadiene available from Goodrich, and has a cis 1,4 content of about 90%. The golf ball has the following physical properties.

| PGA Compression | 43 |
| Hardness, Shore C | 71 |
| Rebound | 59 |

The golf ball has an initial velocity of about 219 feet per second and is found to have excellent "click" and "feel."

EXAMPLE 3

Example 1 is repeated except that Diene 55A is substituted for the Budene 501, 24 parts of diacetone acrylamide is used in place of the acrylamide. Diene 55A is available from Firestone Tire and Rubber Co. and is a polybutadiene composition with about 40% cis 1,4 content, 9% 1,2 content and the balance essentially trans 1,4 content. The golf ball formed from this composition is suitable for use as a golf ball, has good "click" and "feel" and has an acceptable initial velocity.

EXAMPLE 4

Example 1 is repeated except that methacrylamide is substituted for the acrylamide. An acceptable golf ball with good "click" and "feel" is obtained.

EXAMPLE 5

Example 1 is repeated except that ethacrylamide is substituted for the acrylamide. An acceptable golf ball with good "click" and "feel" is obtained.

EXAMPLE 6

Example 1 is repeated except that α-chloroacrylamide is substituted for the acrylamide. An acceptable golf ball with good "click" and "feel" is obtained.

EXAMPLE 7

Example 1 is repeated except that 24 parts of methacrylamide is substituted for the acrylamide. An acceptable golf ball with good "click" and "feel" is obtained.

EXAMPLE 8

In this example a two piece golf ball is made. The formulation of the present invention is used for the central core. The ingredients used are as follows:

| Cis-4 | 100 Parts |
| HiSil | 35 parts |
| Methacrylamide | 20 parts |
| Antioxidant 2246 | 0.5 parts |
| Titanox A-MO | 2 parts |
| DiCup R | 6 parts |
| Zinc Oxide | 5 parts |

Cis-4 is a polybutadiene of about 98% cis 1,4 content and is available from Phillips Petroleum.

The ingredients without the DiCup are mixed on a standard two roll mixer for ten minutes at 170°F. The mixture is cooled to ambient temperature, the DiCup R is added and the mixture is mixed for an additional five minutes. Thereafter, the composition is sheeted out of a mill as a slab of approximately 1/10 of an inch in thickness. A piece of approximately 1 inch by 1½ inches and weighing about 1.6 ounces is cut from the slab, rolled upon itself and placed in a spherical mold of approximately 1.243 inches in diameter. The mold is closed under pressure at a temperature of about 300°F. and the composition is held under this temperature and pressure for about thirty minutes. Thereafter, the central core is removed from the mold and is allowed to secondarily cure for 24 hours at room temperature. Standard golf ball elastic windings are then applied to the central core to bring the size of the composite structure up to about 1.582 inches. Surlyn resin previously molded into standard golf ball hemispherical cups is then molded as a cover for the ball of approximately 0.050 inches in thickness in known manner. Surlyn is a trademark for an ionomeric resin available from DuPont comprising a copolymer of ethylene and a carboxylic acid.

The golf ball is found to have the following physical properties:

| | |
|---|---|
| Diameter | 1.68 inches |
| PGA Compression | 60 |
| Hardness, Shore C | 88 |
| Rebound | 50 |
| Weight | 1.418 ounces |

The golf ball has an initial velocity of about 218 feet per second on the golf ball driving machine used in Example 1.

EXAMPLE 9

It was noted that while the golf ball of Example 8 was acceptable as a golf ball and conformed to USGA specifications, it was somewhat lacking in that USGA specifications permit a weight of up to 1.620 ounces whereas the golf ball of the example had a weight of only 1.418 ounces. Example 8 was therefore repeated except that in addition to the ingredients specified, 62 parts by weight of barium sulfate was added as a weighting agent. This brought the weight of the finished golf ball up to 1.602 ounces. The other physical properties of this golf ball are as follows:

| | |
|---|---|
| Diameter | 1.68 iches |
| PGA Compression | 83 |
| Hardness Shore C | 90 |
| Rebound | 50 |
| Initial Velocity | 217 |

EXAMPLE 10

Example 9 is repeated except that a balata cover is used instead of a cover of Surlyn resin. Comparable results are obtained and the ball has better "click" and "feel" than the golf ball of Example 9.

EXAMPLE 11

Example 9 is repeated except that acrylamide is used in place of methacrylamide. Comparable results are obtained.

EXAMPLE 12

Example 8 is repeated except that the size of the core was made to be 1.582 inches rather than 1.243 inches as in Example 8. As a result, it is not necessary to use any elastic windings on this ball. A Surlyn cover of approximately 0.050 inches in thickness is molded onto the central core.

The golf ball thus formed has the following physical properties:

| | |
|---|---|
| Diameter | 1.68 inches |
| PGA Compression | 67 |
| Hardness, Shore C | 86 |
| Rebound | 50 |
| Weight | 1.53 ounces |
| Initial Velocity | 207 |

It is again noted that while this ball is somewhat lighter than allowed with USGA specifications, the weight of the golf ball can be adjusted by addition of a suitable weighting agent such as barium sulfate.

It will be understood that the claims are intended to cover all changes and modifications of the preferred embodiments of the invention, herein chosen for the purpose of illustration, which do not constitute departures from the spirit and scope of the invention.

What is claimed is:

1. In a golf ball, a composition comprising a cured composition of polybutadiene having a cis 1,4 polybutadiene content of at least 40%, from 1% to 40% by weight of polybutadiene of $\alpha,\beta$ ethylenically unsaturated carboxamide groups having in their monomer form the following structural formula:

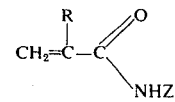

wherein:
R is hydrogen, or a methyl, ethyl, fluoro, chloro, or bromo group; and
Z is hydrogen, or an alkyl, aryl or heteroatom substituted alkyl or aryl group;

at least some of said carboxamide groups being graft polymerized to said polybutadiene the grafted carboxamide groups being attached to the polybutadiene at only one site, and hydrogen ions serving to bond at least some of the grafted carboxamide groups to each other.

2. The golf ball of claim 1 wherein the polybutadiene comprises at least 90% cis 1,4 polybutadiene.

3. The golf ball of claim 1 wherein the carboxamide is methacrylamide.

4. The golf ball of claim 1 wherein the carboxamide is acrylamide.

5. The golf ball of claim 1 wherein the carboxamide is diacetone acrylamide.

6. A golf ball comprising a core and a cover, at least one of which comprises a composition comprising a cured composition of polybutadiene having a cis 1,4 polybutadiene content of at least 40%, from 1% to 40% by weight of polybutadiene of $\alpha,\beta$ ethylenically unsaturated carboxamide groups having in their monomer form the following structural formula:

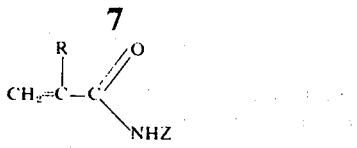

wherein:
R is hydrogen, or a methyl, ethyl, fluoro, chloro, or bromo group; and
Z is hydrogen, or an alkyl, aryl or heteroatom substituted alkyl or aryl group;

at least some of said carboxamide groups being graft polymerized to said polybutadiene the grafted carboxamide groups being attached to the polybutadiene at only one site, and hydrogen ions serving to bond at least some of the grafted carboxamide groups to each other.

7. The golf ball of claim 6 wherein the polybutadiene comprises at least 90% cis 1,4 polybutadiene.

8. The golf ball of claim 6 wherein the carboxamide is methacrylamide.

9. The golf ball of claim 6 wherein the carboxamide is acrylamide.

10. The golf ball of claim 6 wherein the carboxamide is diacetone acrylamide.

11. The golf ball of claim 6 wherein the ball is a two piece ball comprising a core and a cover and the composition of claim 7 is the core.

* * * * *